June 28, 1927.

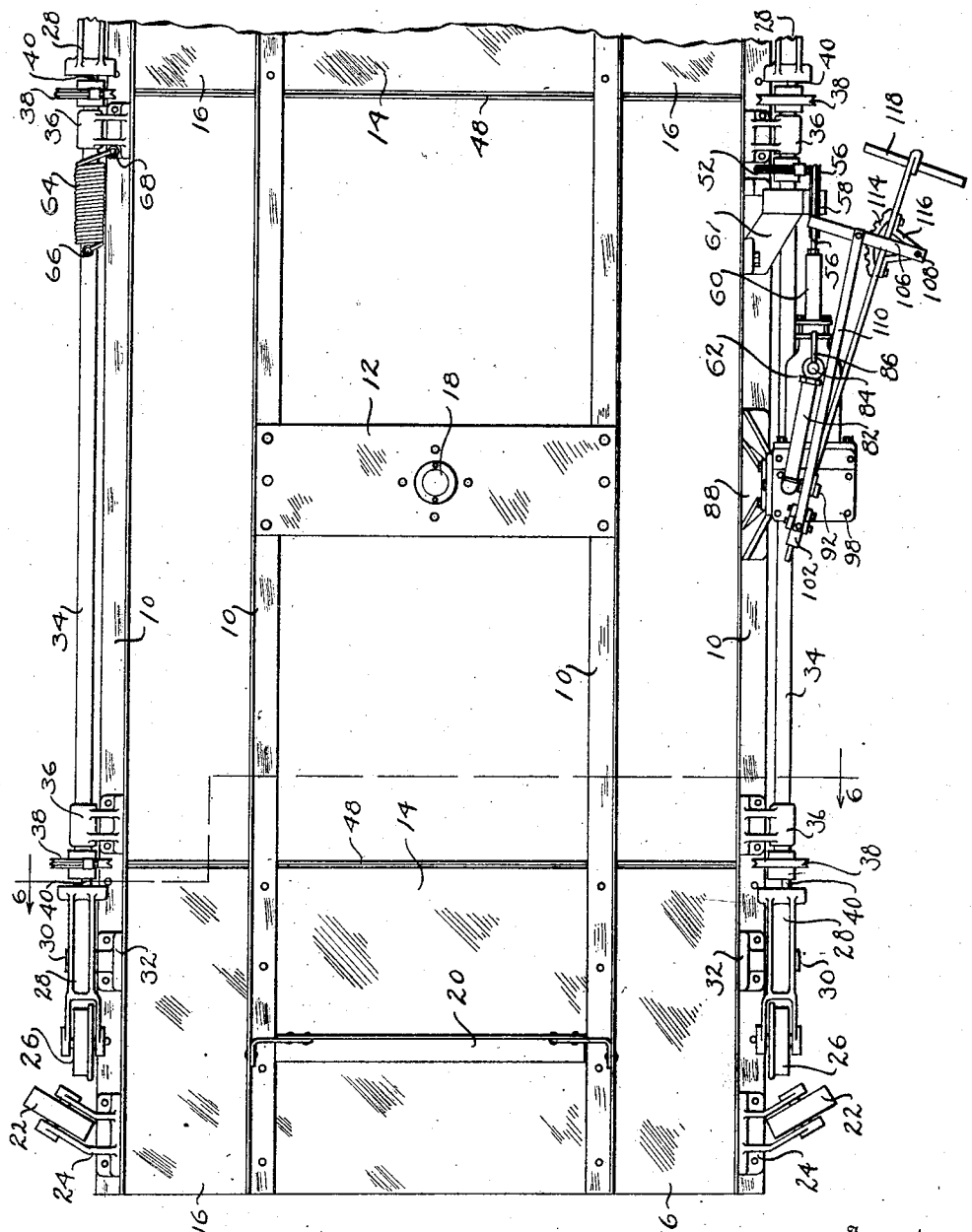

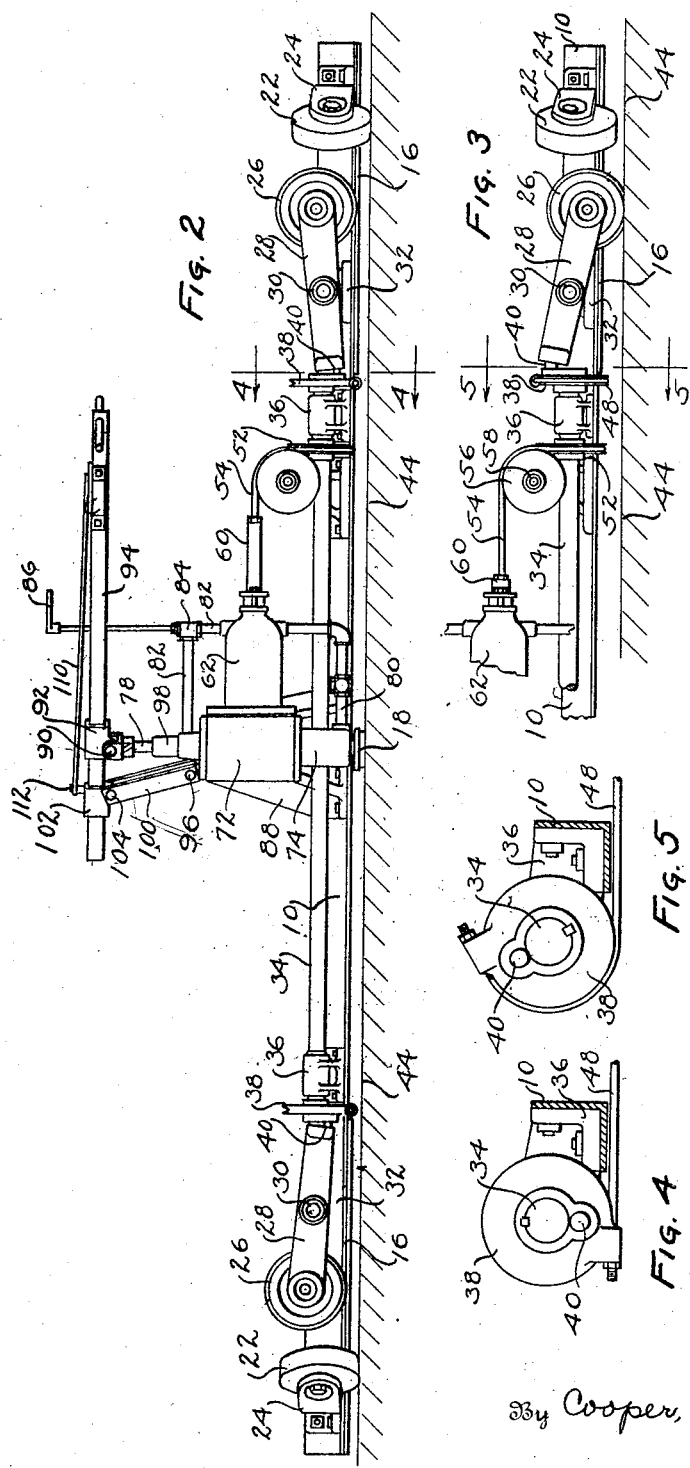

R. CRAIG 1,633,980

TRANSFER TURNTABLE

Filed Oct. 7, 1926

Inventor
R. Craig
By Cooper, Kerr & Dunham
Attorneys

Patented June 28, 1927.

1,633,980

UNITED STATES PATENT OFFICE.

ROBERT CRAIG, OF MAPLEWOOD, NEW JERSEY.

TRANSFER TURNTABLE.

Application filed October 7, 1926. Serial No. 140,052.

This invention pertains to turntables for vehicles, particularly transfer turntables which may be moved from place to place on the floors of garages where automobiles are stored.

The use of such machines is fully explained in my Patent No. 1,596,156, issued August 17, 1926, which discloses a transfer turntable for automobiles, the machine being equipped with turntable wheels and transfer wheels. A hand lever is provided in that machine for raising the entire machine until it is supported on the transfer wheels whenever it is desired to transfer the machine to a new location. Reverse operation of the hand lever lowers the entire machine again onto the turntable wheels with the transfer wheels clear of the floor or rails, in which position the machine is in readiness to receive an automobile for rotation.

The above described device is satisfactory within its limitations, but it cannot be used to transfer an automobile bodily while the automobile is supported on the machine. The machine must be moved unloaded to the place where it is to be used, there lowered onto the turntable wheels, and must be unloaded again before the lever can be operated to prepare the machine for transfer.

The machine disclosed in the present application is of suitable design for manipulation to perform any of its functions whether loaded or unloaded.

The raising and lowering devices are fully operable whether or not an auto is on the machine.

The lifting apparatus provides a high lifting speed when a light car is being handled, but is readily settable to a different lever ratio and slower speed of operation to enable the operator to easily handle a heavy car when necessary.

Suitable devices are provided to transmit the lifting effort from the operating side of the machine to the other side without in any way obstructing the passage of a vehicle onto or off of the machine.

The operating devices are entirely at the sides of the machine so as not to hinder free passage of cars on or off.

Further and other advantages will be hereinafter set forth in the accompanying specification and claims, and shown in the drawings, which by way of illustration show what is now considered to be the preferred embodiment of the invention.

Fig. 1 shows a plan view of the machine with one end partly broken away.

Fig. 2 is a side view of the complete machine, taken on the operator's side.

Fig. 3 is a view of one end of Fig. 2 with the parts in a different position.

Fig. 4 is a sectional view on line 4—4 of Fig. 2.

Fig. 5 is a sectional view on the line 5—5 of Fig. 3.

Fig. 6 is an end view of the machine in position for turning.

Figure 7:
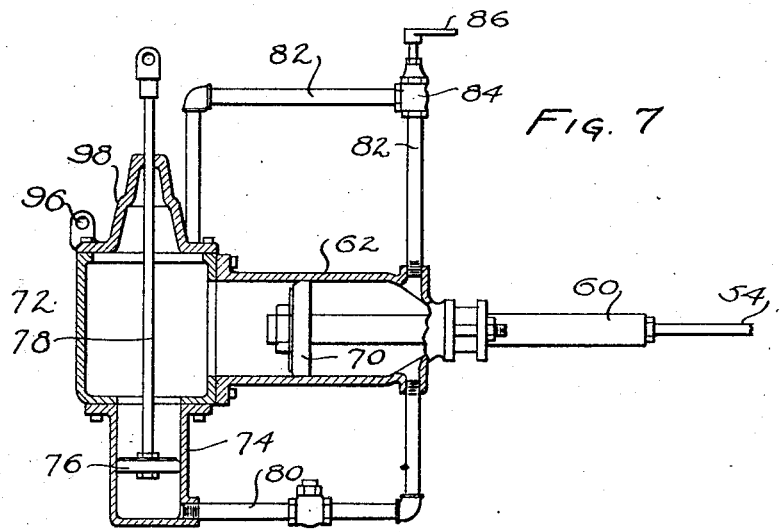
Fig. 7 is an enlarged cross section of oil pump and cylinder.

The machine comprises a frame composed of four longitudinal angles 10, a central cross plate 12, and the runway plates 14, one of which extends across each end of the machine to form the shoes 16 on which the wheels of the vehicle rest while standing on the turntable. Plates 14 are riveted or bolted to the under sides of angles 10. The length of each shoe 16 is about half the width of the machine, or from one outside angle 10 to the center line. The wheels of the vehicle, while running on to or off of the turntable roll on the floor of the garage while passing from one shoe 16 to the other. The length of the machine as a whole is long enough to accommodate the longest car, and the shoes 16 are long enough so that the shortest car will reach easily from shoe to shoe.

A center device 18 is mounted on plate 12, which operates to automatically hold the machine central while being turned, as is fully set forth in the copending application referred to above. Cross angles 20 are bolted to plates 14 for stiffening purposes.

Turntable wheels 22 are mounted in brackets 24 fast to outer frame angles 10 near their ends. Transfer wheels 26 are mounted in the ends of levers 28, there being one wheel 26 adjacent each corner of the machine. Levers 28 are pivoted on studs 30 held in brackets 32 which are fast to angles 10.

Extending along outside the outer angles 10 and parallel thereto are shafts 34, one on each side of the machine. Shafts 34 are mounted for rotation in bearings 36 fast to angles 10.

Fast on each end of each shaft 34 is a sheave 38 and from the hub of each sheave 38 projects a crank pin 40. Each pin 40 projects into a horizontal crosswise slot 42 in the end of each lever 28. The shape of the slot is shown best at the right hand end of Fig. 6.

It will be readily apparent that rotation of shafts 34 will raise or lower crank pins 40 and thereby raise or lower the corresponding ends of levers 34, thus lowering or raising the transfer wheels 26. When the transfer wheels 26 are lowered, the turntable wheels 22 are raised clear of floor 44, as shown in Fig. 3, and the machine may be transported or transferred on rails 46 which are set flush with the floor (Fig. 6).

When wheels 26 are raised clear of floor and track, as in Figs. 2 and 6, the machine is resting on wheels 22, ready to be turned about center pivot 18, as is explained in the above mentioned patent.

In the former machine the raising and lowering operations were accomplished by means of a simple lever arrangement, but in the present machine devices are employed which are more suitable for the work the machine is intended to do. Those devices will now be explained.

Each pair of sheaves 38 on the corresponding ends of shafts 34 are connected together by a wire cable 48. The cables cross the machine underneath angles 10 and adjacent the inner edges of plates 14 (Figs. 1, 3, 4, 6). In this position they offer no obstruction to any function of the turntable or automobile, and being cables, always in tension, they right themselves if accidentally displaced from true position. The ends of the cables are fastened to sheaves 38 by devices 50 which provide for taking up stretch if any should occur.

Figure 8:
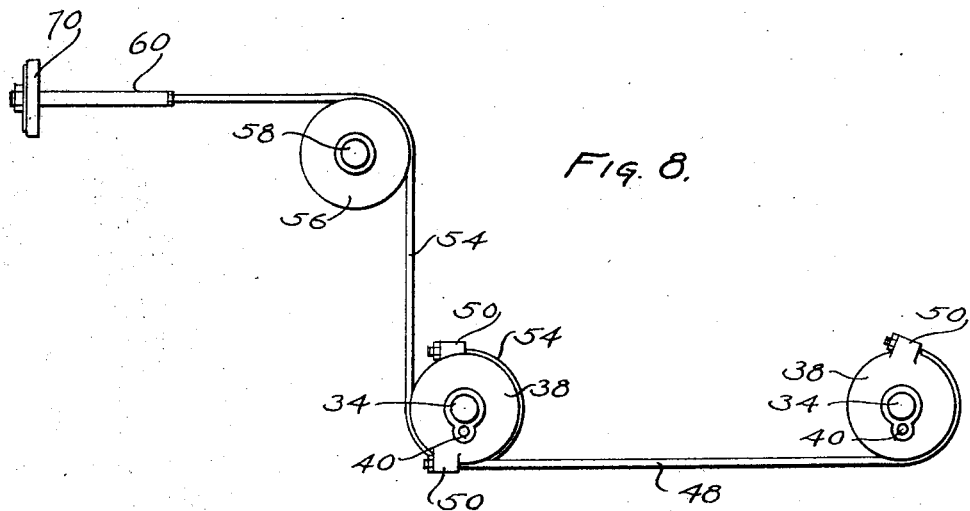
Fig. 8 is an enlarged view of sheaves and cables.

Fast on one shaft 34 adjacent one of its bearings 36 is another sheave 52 (Figs. 1, 2, 3). From sheave 52 a cable 54 passes upwardly and around a sheave 56 which is mounted for rotation on a horizontal stud 58 supported on a bracket 61 above and at right angles to shaft 34. One end of cable 54 is fast to sheave 56, while its other end is fast to a plunger 60 which is operated by a hydraulic cylinder 62. It will be evident that if plunger 60 is drawn to the left, shafts 34 will be rotated clockwise (see Fig. 8), and if plunger 60 is allowed to withdraw from cylinder 62, the shafts will be free to turn counterclockwise. It will also be apparent that, with the load on the transfer wheels as shown in Fig. 3, in which position crank pin 40 is off center as shown in Fig. 5, tension must be maintained in cable 54, or the weight of the turntable and its load, acting through levers 28, will rotate shafts 34 until turntable wheels 22 rest on the floor. That is, the machine is self-lowering from the transfer wheels to the turntable wheels. After the load is off wheels 26 and on wheels 22, additional rotation of shafts 34 is secured by coil spring 64 which is wound around and fastened to shaft 34 on the far side of the machine (Fig. 1). One end of spring 64 is fast to the shaft at 66 and the other end fast to bracket 36 at 68. Spring 64 operates in opposition to plunger 60 sufficiently to always keep cables 48 and 54 in tension and to raise wheels 26 into the clear, after the machine has been lowered onto wheels 22.

Plunger 60 is connected within cylinder 62 to a piston 70, and cylinder 62 is bolted to an oil reservoir 72, attached to the bottom of which is a vertical pump cylinder 74 provided with a piston 76 having a vertical stem 78. The lower end of pump 74 is connected by pipe 80 to the outer end of cylinder 62. The outer end of cylinder 62 is also connected to tank 72 by pipe 82, through valve 84, provided with a hand lever 86.

When pump piston 76 is operated, by stem 78, oil is forced through pipe 80 into the outer end of cylinder 62, forcing piston 70 and plunger 60 to the left, thus rotating shafts 34 clockwise and raising the turntable onto the transfer wheels. It will remain in elevated position until valve 84 is opened, whereupon the oil will be permitted to flow back into tank 72 through pipe 82 and the tension in cable 54 due to the weight of the turntable and its load, plus the action of spring 64, will draw piston 70 to the right until wheels 26 are elevated and the load is carried on the turntable wheels 22. The speed of lowering may be regulated by the operator by means of lever 86. The cylinder, tank and pump are supported on the frame of the machine by bracket 88.

Pump piston 76 is operated through stem 78, which is pivoted at its upper end at 90 on a clamp 92 on hand lever 94 (Fig. 2). Lever 94 is fulcrumed at 96 on tank cover 98 through links 100 which support at their upper ends a crosshead 102, to which links 100 are pivoted at 104. Crosshead 102 is slidable on lever 94 so as to vary the fulcrum distance from 90 to 104. This fulcrum distance is under control of the operator by means of hand lever 106 pivoted at 108 (Fig. 1) and connected by rod 110 and pin 112 to crosshead 102. A quadrant 114 serves to hold lever 106 in any desired position. Quadrant 114 as well as bracket 116 which supports pivot 108, are mounted on lever 94. For the convenience of the operator a cross handle 118 is set into the end of lever 94.

If the operator has a light car to raise he may set lever 106 to provide a long fulcrum distance for lever 94, thus imparting a long stroke to pump piston 76 and a fast speed to piston 76.

If he has a heavy car to raise he can shorten the stroke of the pump by means of lever 106 and thus raise the load more slowly, thereby using his strength to best advantage. As already described, lever 86 enables him to regulate the lowering speeds.

It is to be understood that the invention is not limited to the specific construction herein illustrated and described but can be embodied in other forms without departure from its spirit.

I claim—

1. In a turntable for vehicles, in combination, a set of wheels adapted to support said turntable for rotation, a set of transfer wheels, and means for rendering either set of wheels effective; said means including a lifting device, an operating device with a variable ratio, and settable means for changing said ratio.

2. In a turntable for vehicles, in combination, a set of wheels adapted to support said turntable for rotation, a set of transfer wheels, and means for rendering either set of wheels effective; said means including an hydraulic power transmitting device with a variable speed of operation, means for applying power to said device, and a settable device for changing said speed of operation without change of applied power.

3. In a turntable for vehicles, in combination, a set of wheels normally effective to support said turntable for rotation, a set of transfer wheels normally in ineffective position, an hydraulic device, and means to actuate said device for moving said transfer wheels to effective position and said rotation wheels to ineffective position.

4. In a turntable for vehicles, in combination, a set of turntable wheels, a set of transfer wheels, means for raising said turntable to an elevated position in which the weight thereof is supported on the floor by said transfer wheels with said turntable wheels clear of the floor, means whereby the weight of said turntable is utilized to bring said turntable wheels into contact with the floor, and supplemental devices to thereafter raise said transfer wheels clear of the floor.

5. In a machine for turning vehicles, in combination, transfer wheels on each side of the machine, turntable wheels on each side of the machine, a device on each side of the machine for controlling the said wheels on the corresponding side of the machine, means for applying power to one of said controlling devices, and means for transmitting a portion of the applied power to the controlling device on the other side of the machine.

6. In a machine for turning vehicles, in combination, transfer wheels on each side of the machine, turntable wheels on each side of the machine, a device on each side of the machine for controlling the said wheels on the corresponding side of the machine, means for applying power to one of said controlling devices, and means for transmitting a portion of the applied power to the controlling device on the other side of the machine, said transmitting means comprising a tension member interconnecting said controlling devices.

7. In a machine for turning vehicles, in combination, transfer wheels on each side of the machine, turntable wheels on each side of the machine, a device on each side of the machine for controlling the said wheels on the corresponding side of the machine, means for applying power to one of said controlling devices, means for transmitting a portion of the applied power to the controlling device on the other side of the machine, said transmitting means comprising a tension member interconnecting said controlling devices, and a supplemental device for applying tension to said tension member.

8. In a machine for turning vehicles, in combination, transfer wheels on each side of the machine, turntable wheels on each side of the machine, a device on each side of the machine for controlling the said wheels on the corresponding side of the machine, means for applying power to one of said controlling devices, and means for transmitting a portion of the applied power to the controlling device on the other side of the machine, said transmitting means comprising a member extending across the machine from side to side and interconnecting said controlling devices, said member being so located as to be out of the path of a vehicle passing on or off said machine.

9. In a turntable for vehicles, in combination, a set of wheels normally effective to support said turntable for rotation, a pivot device normally in effective position to guide said turntable for rotation, a set of transfer wheels normally in ineffective position, and power applying means including a ratio changing device, said power applying means being adapted for moving said transfer wheels to effective position and simultaneously moving said rotation wheels and said pivot device to ineffective position.

10. In a turntable for vehicles, in combination, a set of turntable wheels, a set of transfer wheels, means for raising said turntable to an elevated position in which the weight thereof is supported on the floor by said transfer wheels with said turntable wheels clear of the floor, means whereby the weight of said turntable is utilized to bring said turntable wheels into contact with the floor, and a settable device for controlling the speed at which said turntable wheels are brought into contact with the floor.

In testimony whereof I hereto affix my signature.

ROBERT CRAIG.